US010751936B2

(12) United States Patent
Calefati et al.

(10) Patent No.: US 10,751,936 B2
(45) Date of Patent: Aug. 25, 2020

(54) LASER OPERATING MACHINE FOR ADDITIVE MANUFACTURING BY LASER SINTERING AND CORRESPONDING METHOD

(71) Applicant: Prima Industrie S.p.A., Collegno (TO) (IT)

(72) Inventors: Paolo Calefati, Collegno (IT); Massimiliano Carracoi, Collegno (IT)

(73) Assignee: Prima Industrie S.p.A., Collegno (TO) (IT)

( * ) Notice: Subject to any disclaimer, the term of this patent is extended or adjusted under 35 U.S.C. 154(b) by 669 days.

(21) Appl. No.: 15/315,252

(22) PCT Filed: May 28, 2015

(86) PCT No.: PCT/IB2015/054024
§ 371 (c)(1),
(2) Date: Nov. 30, 2016

(87) PCT Pub. No.: WO2015/181772
PCT Pub. Date: Dec. 3, 2015

(65) Prior Publication Data
US 2017/0190113 A1    Jul. 6, 2017

(30) Foreign Application Priority Data
May 30, 2014    (IT) .............................. TO2014A0435

(51) Int. Cl.
*B29C 64/153*    (2017.01)
*B29C 64/20*    (2017.01)
(Continued)

(52) U.S. Cl.
CPC .......... *B29C 64/153* (2017.08); *B29C 64/209* (2017.08); *B29C 64/268* (2017.08); *B29C 64/295* (2017.08); *B33Y 30/00* (2014.12)

(58) Field of Classification Search
CPC ........ B29C 64/153; B29C 64/20; B33Y 30/00
See application file for complete search history.

(56) References Cited

U.S. PATENT DOCUMENTS

2005/0288813 A1    12/2005    Yang et al.
2016/0311027 A1*   10/2016    Shimoyama ............. B22F 7/02

FOREIGN PATENT DOCUMENTS

DE        196 22 471        12/1997
EP        2 708 297         3/2014
JP        2015178192 A  *  10/2015    ................ B22F 7/02

OTHER PUBLICATIONS

Parallel Kinematic Machine Tools—Current State and Future Potentials; Weck, M. and Staimer, D.; CIRP Annals, vol. 51 Issue 2. 2002, pp. 671-683 (Year: 2002).*

(Continued)

*Primary Examiner* — Joseph S Del Sole
*Assistant Examiner* — John Robitaille
(74) *Attorney, Agent, or Firm* — Nixon & Vanderhye P.C.

(57) ABSTRACT

Laser operating machine for additive manufacturing of objects by laser sintering, comprising a transport structure (11), which is movable in a work space (100), operating according to a first system of movement axes (X, Y, Z) and configured to support one or more nozzles (34) for lid emitting sintering powder jets to be sintered on a work substrate (100, 110) and an optical laser assembly (20) for conveying a laser beam (L) in a laser spot (S) focused on said work substrate (100, 110) to sinter said powders, According to the invention, said optical laser assembly (20) is integrally associated with said transport structure (11) and a movable element (12) is also integrally associated with said transport structure (11) operating according to a second system of movement axes (u, v), said movable element (12) comprising a tool-carrier frame (30), on which one or more nozzles (34) for emitting sintering powder jets are arranged, (Continued)

associated with said second system of movement axes (u,v) and movable with respect to said optical laser assembly (20).

20 Claims, 7 Drawing Sheets

(51) Int. Cl.
*B33Y 30/00* (2015.01)
*B29C 64/209* (2017.01)
*B29C 64/268* (2017.01)
*B29C 64/295* (2017.01)

(56) References Cited

OTHER PUBLICATIONS

Development of a Low-Cost Parallel Kinematic Machine for MUltidirectional Additive Manufacturing; Xuan Song, Yayue Pan, and Yong Chen; J. Manuf. Sci. Eng 137(2), 021005 (Apr 1, 2015) (13 pages) (Year: 2015).*

* cited by examiner

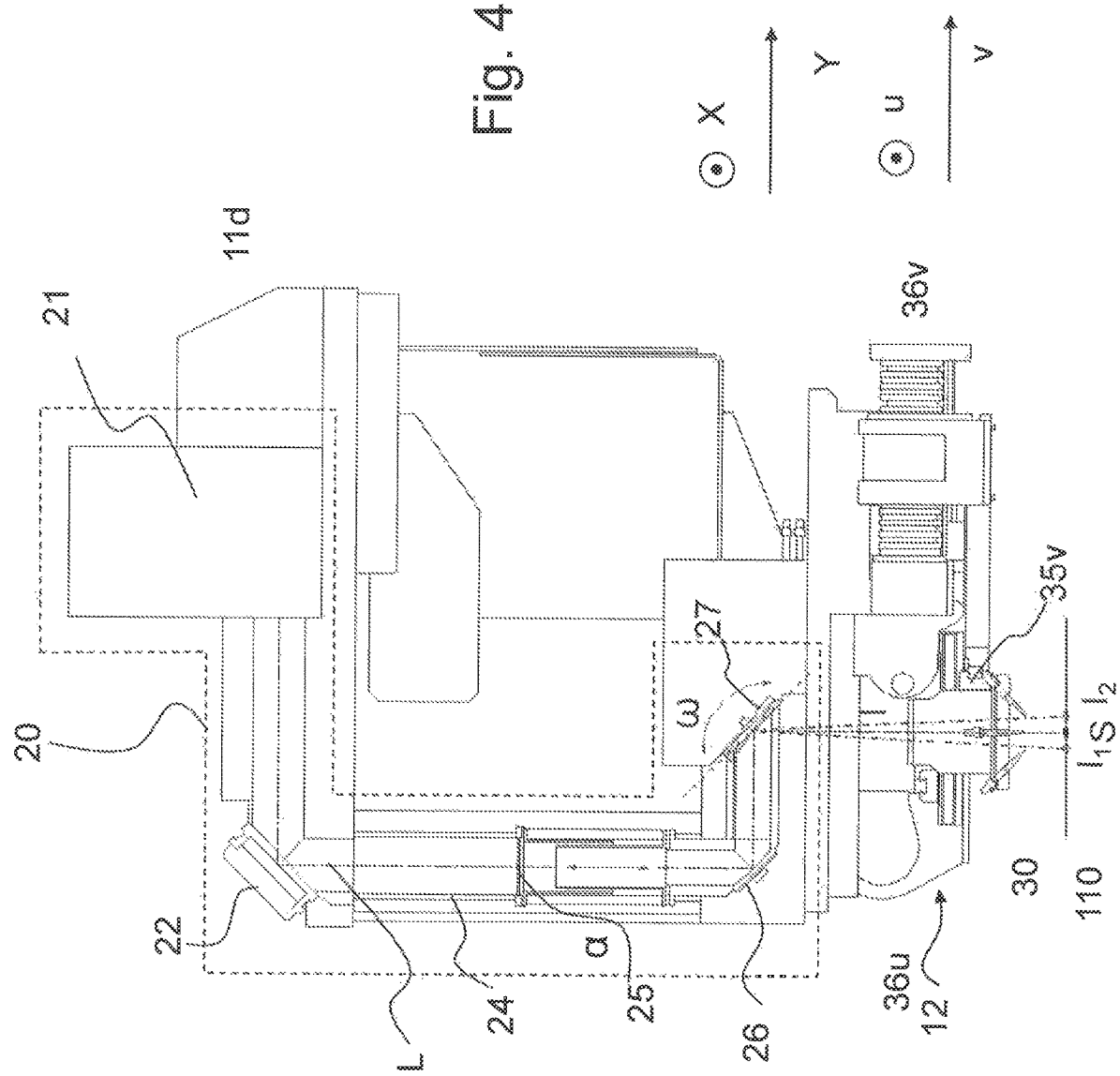

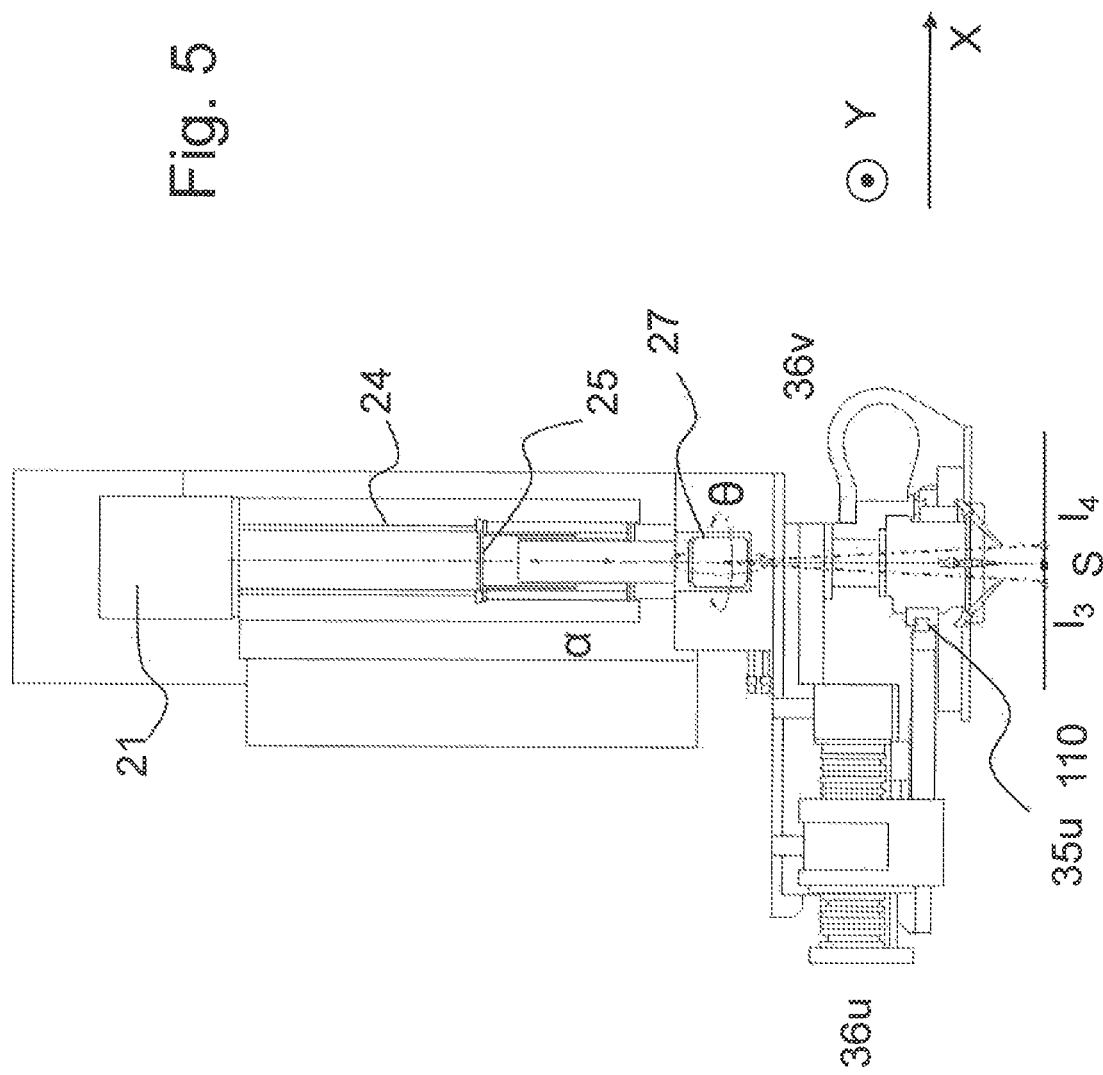

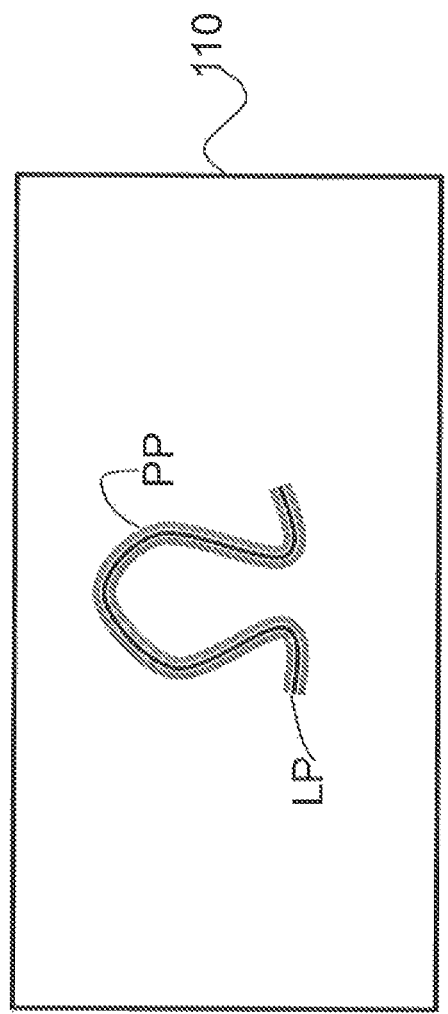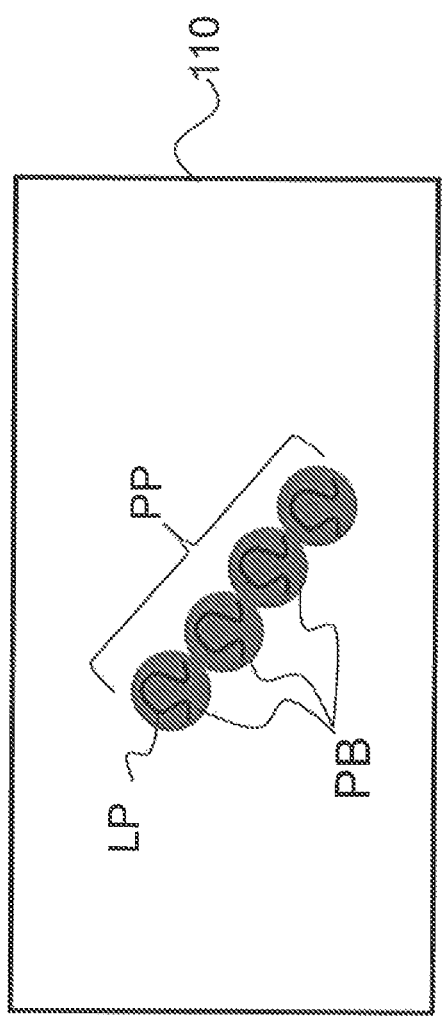

LASER OPERATING MACHINE FOR ADDITIVE MANUFACTURING BY LASER SINTERING AND CORRESPONDING METHOD

This application is the U.S. national phase of International Application No. PCT/IB2015/054024 filed 28 May 2015, which designated the U.S. and claims priority to IT Patent Application No. TO2014A000435 filed 30 May 2014, the entire contents of each of which are hereby incorporated by reference.

TECHNICAL FIELD

The present description relates to a laser operating machine for additive manufacturing of objects by laser sintering, comprising a transport structure having a first system of movement axes and configured to support one or more nozzles for emitting sintering powder jets on a work substrate and laser means for conveying a laser beam (L) in a laser spot (S) focused on said work substrate to sinter said powders, Various embodiments can be applied to the sintering of objects of large volume, starting from thermoplastic or metallic sintering powders (stainless steels, aluminium, titanium, cobalt-chrome, Nickel super-alloys, precious alloys), and any combinations thereof.

TECHNOLOGICAL BACKGROUND

The manufacturing additive process for laser sintering consists of depositing successive layers of sintering powders so as to compose complex geometric shapes. Several manufacturing production sectors, such as the automotive and aerospace sectors, are considering these processes for manufacturing large complex metal or metal alloy objects. The accretion techniques currently employed are limited in the increase of size of the objects to be produced. The technologies currently used are of two types:
  additive manufacturing based on powder bed technology
  additive manufacturing by metal deposition In powder bed technology, the process occurs in a chamber emptied and filled by inert gas. A powder bed is formed with a laminar flow. A laser scanner connected to a single mode laser source, and with a constant size of the laser spot, directs the focused radiation towards the powder bed thus performing the sintering. The powder bed simultaneously provides the sintering material and acts as a support for constructing the piece. The drawback of this technology is that it is limited in implementations of large-sized chambers (with dimensions greater than 250×250×250 mm): the process in such conditions would be inconvenient due to the inefficiency in using the powders and deformations would occur in the sintering with respect to the required geometry.

The technology for metal deposition is an evolution of that used for metallic coating, or cladding. A nozzle for cladding aligned to the beam of a machine for laser processing provides the jet of metal powder required for sintering. Although this technology allows the manufacture of large parts, it is limited in the precision of the process and in the low productivity due to the slowness of the movement axes of the support machine.

OBJECT AND SUMMARY

The embodiments described here are intended to improve the methods and systems according to the prior art as previously discussed.

Various embodiments achieve this object thanks to a laser operating machine for additive manufacturing of objects by laser sintering having the characteristics referred to in the following claims.

Various embodiments also relate to a corresponding method for additive manufacturing of objects by laser sintering.

The claims form an integral part of the technical disclosure provided here in relation to the invention.

BRIEF DESCRIPTION OF THE FIGURES

Various embodiments will now be described, purely by way of example, with reference to the attached drawings, in which:

FIGS. 3, 4 and 5 show three views of a detail of the machine of FIG. 1;

FIGS. 6a and 6b show two modes of operation of the method according to the invention;

DETAILED DESCRIPTION

Figure 1:
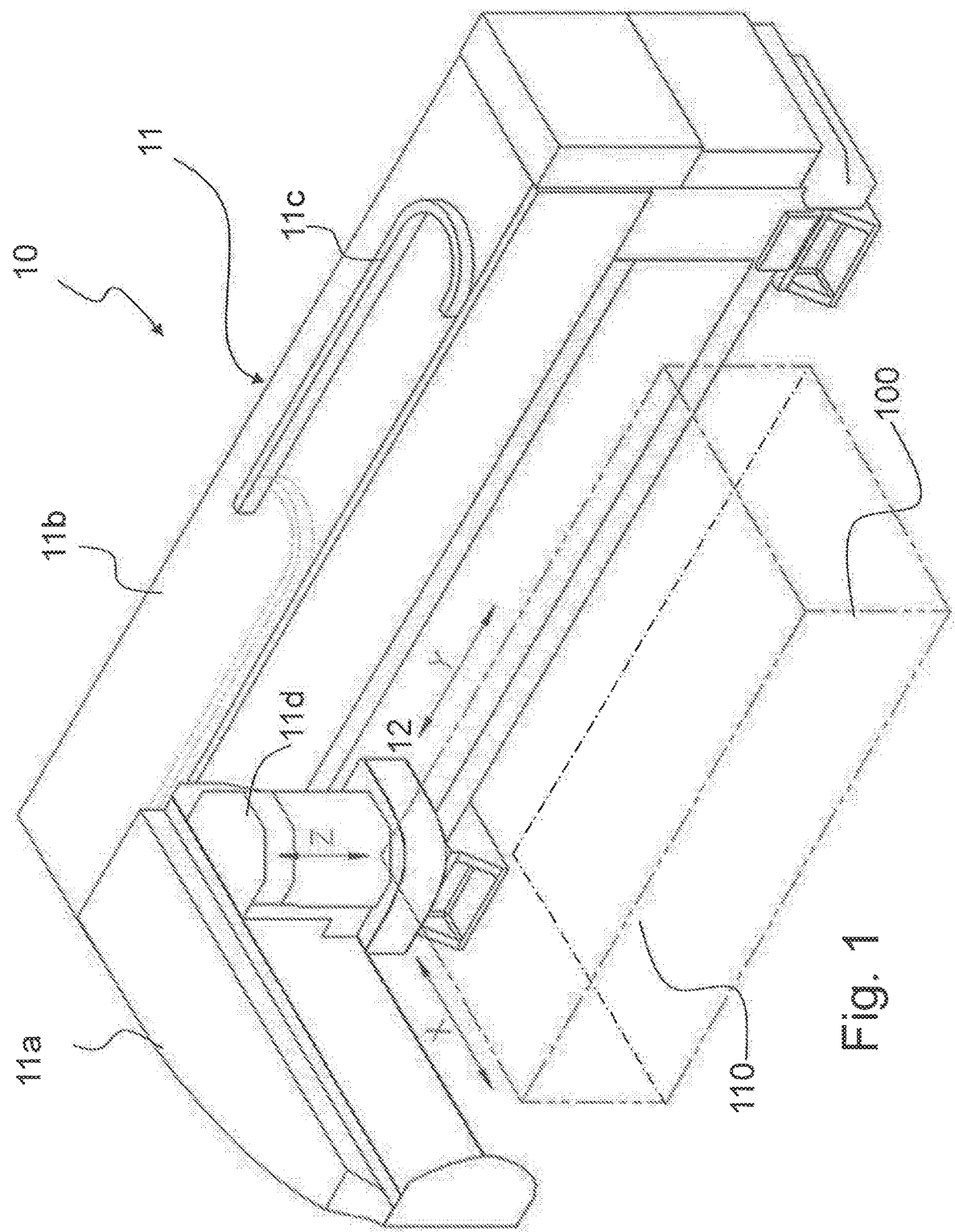
FIG. 1 shows a perspective schematic view of a laser operating machine.

In the following description, numerous specific details are provided in order to allow the maximum understanding of exemplary embodiments. The embodiments can be implemented with or without specific details, or with other methods, components, materials, etc. In other circumstances, well-known material structures or operations are not shown or described in detail to avoid obscuring aspects of the embodiments. The reference to "an embodiment" within this description indicates that a particular feature, structure or characteristic described in connection with the embodiment is included in at least one embodiment. Therefore, the use of the phrase "in an embodiment" in various places within this description does not necessarily refer to the same embodiment. Furthermore, particular features, structures or characteristics may be combined in any suitable manner in one or more embodiments.

Headers and references are provided herein for the reader's convenience only and do not define the scope or significance of the embodiments.

Briefly, the proposed laser operating machine comprises:
  a transport structure that allows the displacement of a movable element along a first plurality of axes, or rather the three Cartesian axes X, Y and Z. These movements preferably take place with low dynamics, in particular at relatively low accelerations;
  a movable element with parallel kinematics, having a respective plurality of translational or rotational movement axes, which are redundant, or rather, with parallel kinematics, with respect to the transport structure that moves the movable element. These axes are preferably equipped with large dynamic capacity in terms of acceleration and maximum velocities and are therefore controlled with high dynamic movements;
  a tool-carrier frame, in particular a circular crown frame, integral with the axes of the movable element with parallel kinematics or possibly tiltable according to one or more axes thanks to the movement of the axes of this movable element with parallel kinematics, on which one or more nozzles for emitting jets of sintering powder are arranged, and possibly protection gas, in particular coming from supply systems of powder and/or gas possibly remotely arranged, this frame being of a shape such as to internally define a passage area that allows the passage of a laser beam for sintering;

an optical assembly comprising optical scanning means, or rather an optical laser scanner integral with the vertical movement axis or Z of the transport structure and comprising:

an orientating mirror, movable with high dynamics for directing the sintering laser beam, and therefore the laser spot, within a conical space through a rotation around two perpendicular axes, a focussing element, which also operates with high dynamics to vary the focus point or laser spot within this conical space, and a stationary mirror which directs the vertical laser beam coming from the focussing element, in particular horizontally, towards the orientating mirror.

FIG. 1 therefore shows a perspective schematic view of an embodiment of the laser operating machine, indicated overall by the reference number 10, which comprises a transport structure 11, configured to move a support 11d, essentially a vertical support, with which a movable element 12 is integrally associated, along a first plurality of axes, specifically three Cartesian axes X, Y, Z. For this purpose, the transport structure 11 comprises two orthogonal arms 11a and 11b for displacing the movable element 12 by means of motors (not shown in FIG. 1) along the axes X and Y. In particular, in a known manner, the arm 11a is actuated to slide along a guide in the arm 11b (Y axis), while a motor causes the movable element 12 to move in a guide along the arm 11a (X axis). An additional motor (also not shown) operates a displacement along the Z axis of the movable element 12 relative to the arm 11a. As shown in FIG. 1, due to this configuration, displacing the movable element 12 occurs in a working volume 100, essentially a parallelepiped whose dimensions are defined by the strokes of the movable element 12 along the horizontal axes X and Y, and vertical axis Z. A work plane 110 is also indicated in FIG. 1, which essentially corresponds to the lower face of the working volume 100. The work plane 110 is the plane, or work substrate, from which, as described below, sections of an object to produce are sintered in an additive manner. Alternatively, the transport structure 11 can be, for example, of the portal type.

Furthermore, in FIG. 1, 11c indicates a catenary which comprises an optical fibre to carry the laser radiation, cabling and possibly protection gas, such as argon or nitrogen, and sintering powders from respective feeding devices remoted to the components in the movable element 12 and a laser optical assembly 20, comprising an optical scanner, associated with the transport structure 11, in particular with the support 11d.

Figure 2B:
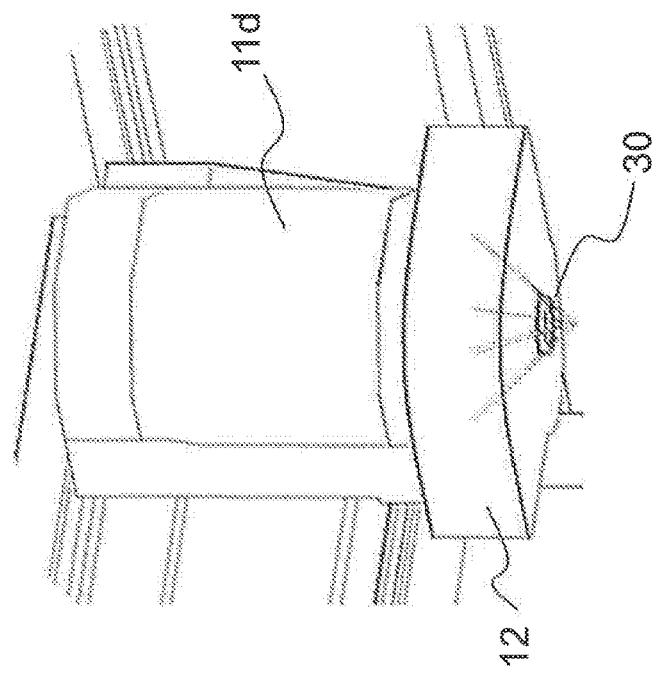
FIGS. 2a and 2b show two details of the view of FIG. 1.
Figure 2A:
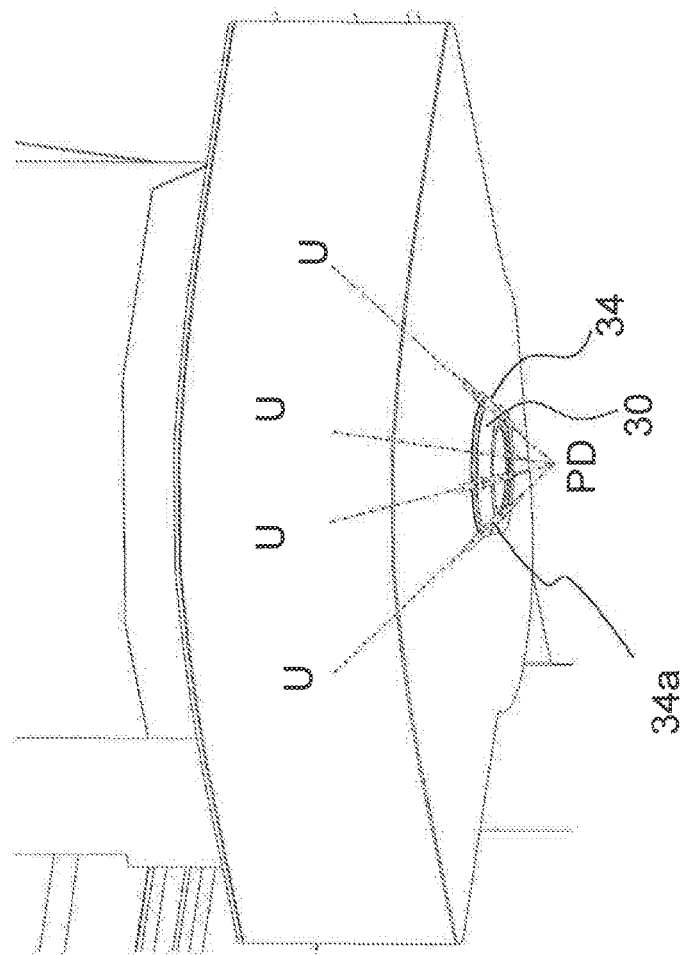

In FIG. 1 only an outer protective casing, or cover, of the support 11d and the movable element 12 is visible, illustrated as enlarged in the perspective view of FIG. 2a, to show how the movable element 12 has a tool terminal in the lower part, represented by a plurality of nozzles 34 for emitting sintering powder mounted on a tool-carrier frame 30 included at the lower part of the movable element 12, so as to define a perimeter, defining a passage area within it. In particular, in the embodiment described in FIG. 2a, this perimeter defined by the nozzles 34 is circular, so that the tool-carrier frame 30 creates a crown 30 of nozzles 34. As best seen in FIG. 2b, which shows this crown 30 of nozzles 34 in further detail, the nozzles 34 are preferably arranged, with respect to a vertical axis that connects the crown to the work plane 110, with their longitudinal nozzle emission axes U inclined towards an axis passing through the centre of the perimeter, so that these nozzle axes U intersect each other at a deposition point PD of the powders. According to a preferred embodiment, one or more of these nozzles 34 is a nozzle for spraying protection gas. In FIG. 2b, this is indicated with 34a.

Figure 3:
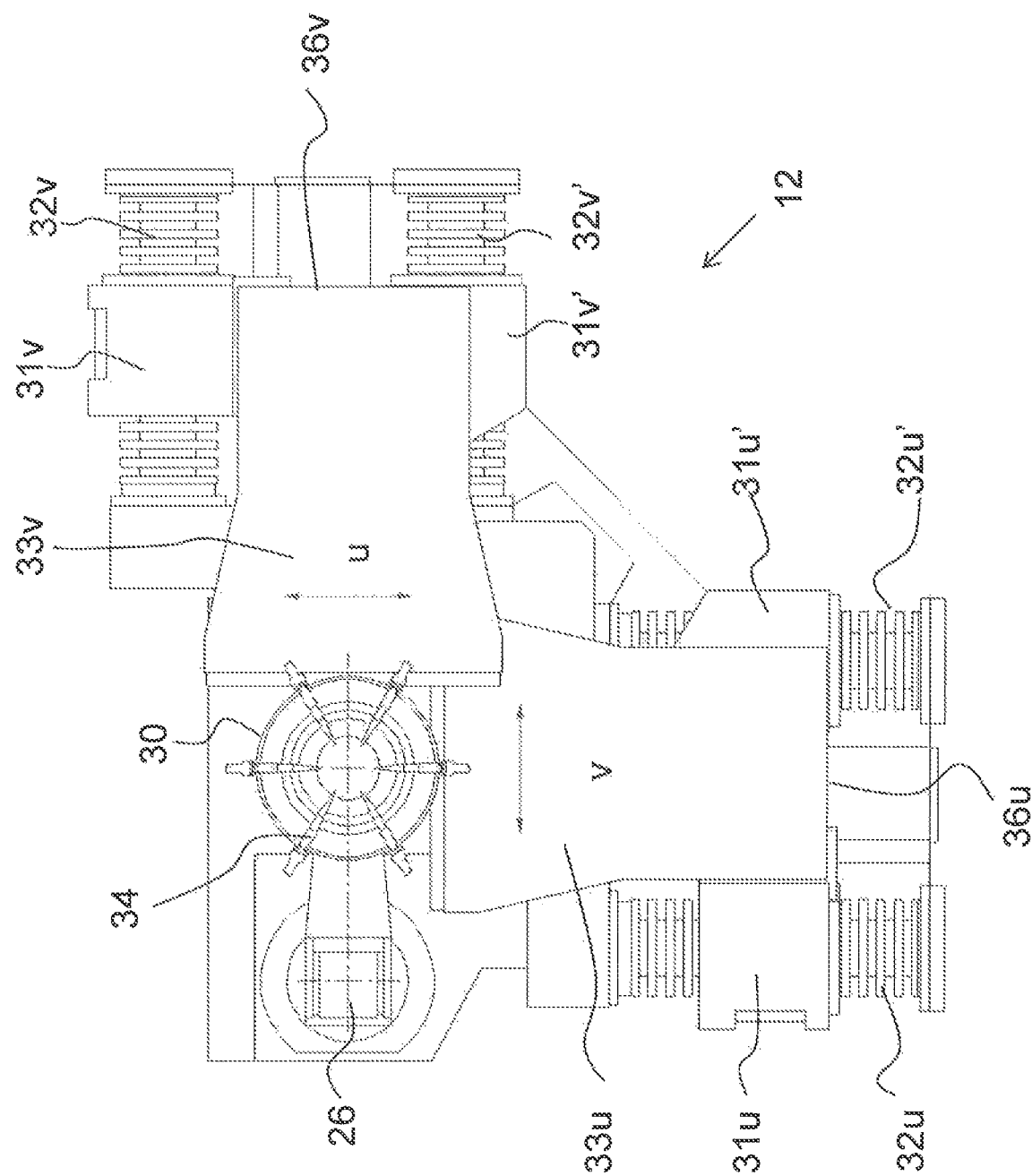

FIGS. 3, 4 and 5 show, respectively, a plan view from below and two side views of the support 11d and of the movable element 12, devoid of the outer protective casing.

In the side view of FIG. 4, in which the X axis points in a direction emerging from the plane of the figure, it can be observed, above all, how the movable element 12 is integrally fixed to the support 11d, to be transported along the first plurality of movement axes X, Y, Z. In the same way, the optical assembly comprising the optical scanner 20 is fixed to the support 11d, integrally with the Z axis of the support 11, but not to the movable element 12, and directs and focuses a laser radiation L into a laser spot S in the working volume 100.

For this purpose, the optical scanner 20 comprises a collimator 21, which conveys the laser radiation L, coming from an associated continuous laser source with power characteristics suitable for the sintering, inciding along the Z axis, through a mirror 22 in a movable focussing element 24, which essentially comprises a lens 25 movable through linear actuators along the direction of an optical axis α parallel to the axis Z. Downstream of the movable focussing element 24, a stationary mirror 26 perpendicularly deflects, or rather in the horizontal direction, the laser radiation towards a orientable mirror 27, which is movable and actuated by a galvanometric actuator (not shown in the figure) to rotate the orientable mirror 27, and therefore the laser beam L deflected by it, along two mutually perpendicular rotation axes, or rather a first rotation axis θ corresponding to the longitudinal axis of the mirror 27, and a second rotation axis ω, perpendicular to it and parallel to the axis X. By moving the orientable mirror 27 along these axes, it is possible to move the laser radiation L with respect to a normal axis of incidence I, for example, up to limit directions $I_1$, $I_2$ (ω axis) shown in FIG. 4 and $I_3$, $I_4$ (axis θ) shown in FIG. 5, thus moving, in this way, the laser beam L within a conical space defined by these limit directions $I_1$, $I_2$, $I_3$, $I_4$, as well as the laser spot S on the work plane 110 in the directions X and Y. It is clear from FIGS. 4 and 5 that these limit directions $I_1$, $I_2$, $I_3$, $I_4$ and the conical space are defined by the line joining the perimeter of the crown 30 with the centre of the orientable mirror 27. Since the laser spot S, due to the rotational axes θ and ω, moves precisely along a spherical cap, however, by means of the action of the focussing element 24, which moves along the optical axis α, the position of the focussing lens 25 can be compensated by moving the focus point, or rather the laser spot S, so as to obtain displacements of this on a flat surface. It is clear that the focussing element 24 also allows displacement of the laser spot S focused along the Z axis, also independently from the effect of the rotation axes θ and ω. The optical scanner 20 described here is modelled on the known optical scanner in the patent EP 1 228 835 by the same Applicant.

Referring to the movable element 12 associated with the lower part of the support 11d, in the view of FIG. 3 the crown 30 of nozzles 34 is visible, within which the laser beam L passes. This crown 30 is moved according to a second plurality of translational and/or rotational movement axes, specifically two axes u and v, parallel to the axes X and Y, and therefore defining a kinematic redundancy with respect to these axes.

For moving the crown 30 by the movable element 12, two sliding systems 31u and 31v are generally employed, for the axis u and the axis v, which comprise an actuator obtained by means of a linear motor 32u or 32v, which operates in a manner known per se on a ball screw 33u or 33v. The linear motor 32u or 32v carries a parallelepiped-shaped arm 34u or 34v, provided on the side towards the crown 30 of a respective sliding guide 35u or 35v, within which slides the tool-carrier or crown 30 under the action of the other arm 34v or 34u. This type of movement of the axes of the sliding movable element 12 is, however, in itself known, for example, it is described in European Patents EP 1 793 963 B1, EP 1 838 486 B1 and patent application EP 1 294 544 A1 by the same Applicant, and other mechanical arrangements for moving the crown 30 may be adopted in various embodiments.

In the embodiment described with reference to FIGS. 3, 4, and 5, sliding systems 31u and 31v comprise second linear motors, respectively 31u' and 31v', operating on respective ball screws 32u' and 32v' of movement of balancing masses 37u' and 37v'.

These balancing masses associated with the movement axes of the movable element allow, in a known way, given the dynamic performances normally requested from the axes of the movable element 12, reduction of the transmission of unwanted vibrations of the movable element 12 to the transport structure of the machine, ensuring manufacturing and productivity accuracy on the extended working volume typical of the transport structure. These movable balancing masses 37u and 37v are displaced, each in an opposite direction to that of the displacement of the relative arm 33u and 33v associated with it, with equal velocity and acceleration. This balancing system is also described, for example, in European patent EP 1793963 B1.

FIG. 5 shows another front view (Y-axis emerging from the plane of the drawing) of the support 11d, the optical scanner 20 and the movable element 12, in which the movement axes of the optical scanner 20 can be better appreciated, which constitute a third plurality of movement axes, for moving the laser spot S. As can be seen, the first rotation axis of θ and the second rotation axis ω are perpendicular to each other, lie in the plane of the orientable mirror 27 and pass through the centre of the orientable mirror 27. The second rotation axis ω is parallel to the axis X and perpendicular to the axis that connects the centre of the stationary mirror 26 and the orientable mirror 27.

Figure 7:
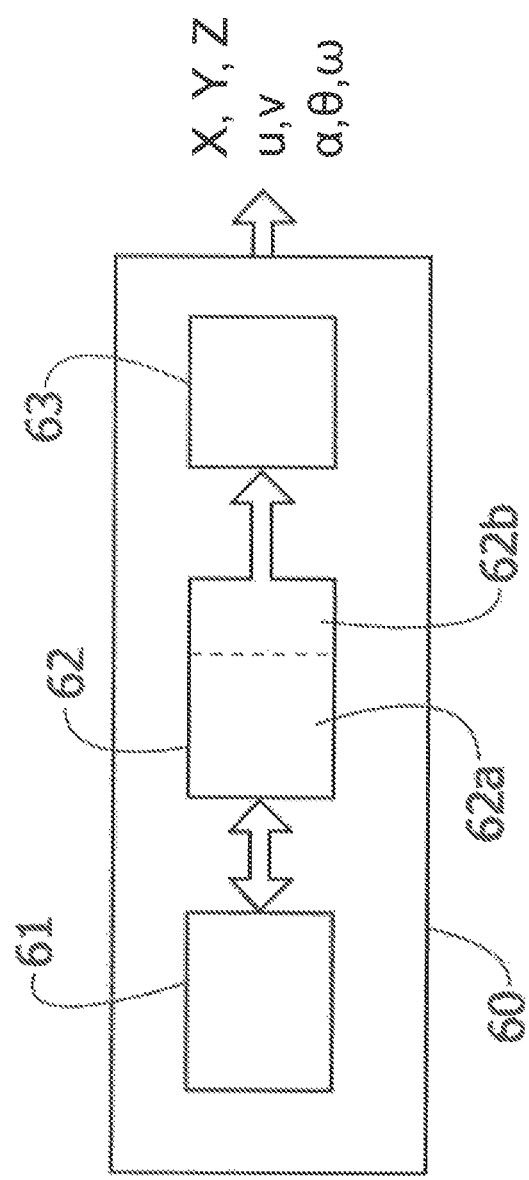
FIG. 7 shows control architecture of the operating machine described.

FIG. 7 shows a schematic diagram of the architecture of a numerical control unit 60 for managing the control of the actuators, or rather the motors of the transport structure 11, which move the axes X, Y, Z, of the movable element 12, which move the sliders 31u, 31v and therefore the axes u, v, of the optical scanner 20, or rather the linear actuators of the translational axis α and the galvanometer actuator of the rotational axes θ and ω. This unit 60 comprises two personal computers 61 and 62. The personal computer operates as a user interface to send instructions and commands to the second personal computer 62, which preferably comprises an operating system 62a associated with Real Time-type extensions 62b for managing the machine. The operating system may be, for example, of Linux- or WinCE-type, or be obtained through proprietary solutions. The personal computer 62 then provides the trajectories to be performed at a servo-control board 63 of the DSP PCI type for controlling the actuators.

In the personal computer 62 and the servo-control board 63, management procedures of the axes of the laser machine 10 are implemented, in particular management of the redundant axes, which will be explained in further detail below.

The numerical control unit 60, according to procedures known per se in the state of the art, generates a sequence of instructions P, corresponding to a so-called 'part program', for a "virtual" machine with determined acceleration and velocity specifications. This sequence of instructions P comes from the personal computer 51, and is originated by a suitable program, to set the trajectories and movements of the machine offline. An interpolation function is applied to it which provides, on the basis of the sequence of instructions P, the generation of a trajectory of the operating machine. This trajectory of the operating machine corresponds to the kinematic coordinates that describe, in time, the motion of a point of the operating machine, for example, a joint or a terminal, or Tool Centre Point (TCP). This interpolation operates in response to a preparation code, or G-Code, sent as part of the sequence of instructions P. The interpolation operation is implemented via software in the personal computer 62.

Note that in the laser operating machine described, the unit 60 is also configured to send additional commands related to adjustment, for example, the flow rate of the jets of sintering powder and the flow rate of the protection gas. These commands can be associated with the sequence of instructions P so as to take place at determined points and instants defined by the trajectory of the operating machine.

As is clear from that described previously in relation to FIGS. 1-5, and explained in greater detail later in FIG. 6a, the actuators of the laser operating machine 10, which operate according to the first set of axes (X, Y, Z), the second set of axes (u, v) and the third set of axes (α, θ, ω) allow function according to two-dimensional trajectories, but also according to three-dimensional trajectories.

It should be noted here that with a trajectory that functions according to determined axes, a function of kinematic variables corresponding to said axes, for example, is intended. Corresponding linear kinematic variables (displacements, velocities, accelerations) are associated with the axes X, Y, Z, u, v, as well as with the translation axis α, which determines the displacement of the focus of the laser L, while the rotational axes θ, ω are associated with corresponding angular kinematic variables (rotation angles, velocities and angular accelerations).

Furthermore, the laser machine 10, as shown with reference to FIGS. 1 to 5, has two terminals or operative ends, the crown of nozzles 30, which defines the powder deposition point PD and the optical scanner 20, which in its portion relative to the orientable mirror 27, defines the position of the focused laser spot S. These terminals do not necessarily move integrally with each other, but can follow the respective manufacturing paths, as better detailed with reference to FIGS. 6a and 6b. In particular, as already described, the crown 30 of nozzles is movable with respect to the optical scanner 20.

Therefore, in general, a method for the additive manufacturing of objects by laser sintering can be applied to the laser operative machine 10, which comprises the setting of a powder emission path to emit, by means of the nozzles 34 of the crown 30, powders of a material to be sintered on a work plane 110 according to an emission path of the powders, setting a laser sintering path to send, via said optical assembly 20, the focused spot of a laser beam along a laser sintering path on said emitted powders, according to said second emission path for performing the sintering, commanding the actuators of the laser operating machine associated with the machine axes by means of the numerical control unit 50 and the servo-control module 53 to fulfil trajectories by means of respective axes to perform said sintering and emission PP paths in which this function of commanding the actuators comprises a operation mode in which the actuators 31u, 31v of said movable element 12 are controlled to move the crown 30 of nozzles 34 in a movable manner with respect to the optical unit 20.

Therefore the machine actuators 10 can be provided with a trajectory corresponding to an emission path of the powders that causes a relative movement of the crown 30 with respect to the optical scanner 20, whose position is generally integral with the transport structure 11.

Moreover, by means of the action of the optical scanner 20 on the third set of axes, the laser spot S can also be displaced by a relative movement with respect to the deposition point PD of the powders. Therefore, in various embodiments, this allows additional operation modes, for example, an operation mode that envisages the simultaneous actuation of the axes, which move the crown 30 and of the axes of the optical scanner 20, or rather of the components 24, 25, 26, 27 and allows the deposition point PD of the powders and the focussing spot S to move relative to each other. As noted with reference to FIGS. 4 and 5, the perimeter of the crown 30 and the position of the centre of the orientable mirror 27 define a conical space through which the laser beam L and the spot S move. In general, given that the crown 30 is movable with respect to the optical scanner 20, this conical space may have the shape of an oblique cone, in particular an oblique circular cone in the form described.

The specific operation modes of the laser operating machine 10 will now be described in greater detail.

With reference to FIG. 6a, given a work path to obtain a determined sintered section of an object, it is envisaged to set an emission path of the powders PP and a sintering path LP of the laser spot S focused on the work plane 110. In particular, according to that indicated in FIG. 6a, the emission path of the powders PP and the sintering path LP are, in various embodiments, essentially congruent from the point of view of the spatial coordinates. The sintering path PL and the emission path PP can be simultaneously followed by the crown 30 and the optical scanner 20, or rather the laser spot S and the deposition point PD are aligned, intersecting at a processing point, or the laser spot S can be commanded to follow the powder emission path PP with a time delay according to the sintering path LP, or rather it operates with a given time delay on the powders deposited continuously or in a succession of deposition points PD. In these modes, the flow rate parameters of the powder jets, flow rate parameters of the possible protection gas, and the power parameters of the laser beam L may, in various embodiments, essentially correspond to those used in metal deposition technology. Furthermore, as exemplified below with reference to FIG. 6b, the emission path of the powders PP and the sintering path LP may, in other embodiments, be not spatially congruent, in particular the emission path of the powders can determine powder areas (local powder beds) within which the sintering path follows shapes within said regions, but not congruent with the entire region.

Therefore, the method for the additive manufacturing of objects by laser sintering comprises emitting powders of a material to be sintered on the work plane 110 according to an emission path of the powders PP and sending a focused spot S of a laser beam L according to a laser sintering path LP of said powders emitted according to said emission path PP to perform the sintering, in various embodiments, comprises providing a trajectory of powder emissions generated by said emission path or a component of said trajectory to the actuators of said movable element for moving said frame of nozzles and providing a sintering trajectory generated by said sintering path LP or a component of said trajectory to the actuators to the axes of the optical assembly 20.

Component of the trajectory means that each powder emission or sintering trajectory can be subdivided, according to different criteria, into trajectory components, exploiting the redundant kinematics of the operating machine. For example, a criterion can be applied, such as a dynamic criterion (for example, by applying a low-pass or high-pass filtering) or a criterion linked to the values of velocity and/or acceleration or a criterion linked to forms defined by the path or trajectory to be performed or a criterion linked to angles.

The movable element 12 and the optical scanner 20, in fact can be provided with an entire trajectory or a component of a trajectory as each of them operates according to axis systems that define a respective redundant kinematic with respect to the transport structure 11. The movable element 12 has movement axes u, v, redundant with respect to axes X and Y. The optical scanner 20, as discussed, presents only the translation axis that determines a redundant positioning with respect to the vertical axis Z. However, as mentioned, the axes of the optical scanner 20 can be employed to obtain a displacement in the work plane, redundant with respect to that of the axes X, Y, or in the working volume 100, redundant with respect to that of all three axes X, Y, Z.

Therefore, it is clear that the laser operating machine 10, essentially having three machines: the transport structure 11, movable element 12, and optical scanner 20, with redundant kinematics, can operate many different types of distributions of the components of the trajectory.

For example, it is envisaged to perform a distribution of components of the powder emissions and/or sintering trajectory on said transport structure 11, in particular distributing components with low dynamics on said transport structure 11.

In greater detail, the transport structure 11 involves transporting the optical scanner 20 and the movable element 12 in the working volume 100, in particular in a work plane 110, along the axes X, Y, Z. The movable element 12 moves according to the respective axes u, v, so that the position of the crown 30 of nozzles 34 can be moved with respect to the position of the optical scanner 20. This displacement of the crown 30 takes place according to the axes u, v, redundant with respect to axes X, Y. The transport structure 11 and the movable element 12, in fact, determine a system with redundant axes, which determines the redundant movement of the crown 30 of nozzles 34, with respect to the main transport structure 11. The redundancy involves the axes X and Y of the transport structure 11 as, for structural and process reasons, the movement of the process point, given by the intersections between the powder deposition point PD and the focused laser spot S preferably takes place along work planes 110, or rather, sections of the object to be produced, while on the Z axis, the advances are generally limited to the displacement between one section and another to an extent dependent on the diameter of the powders used and/or the minimum resolution of the movement axis of the main transport structure 11.

In a possible embodiment, which operates in a similar way to the metal deposition, the process point, or rather the point in which the process is performed, is indicated by the intersection between powder flows of the nozzles 34, or rather the nozzle axes U, that is, the point PD, protection gas flows and the laser spot S, or rather the focused laser beam L. The sequence of these process points represents a processing path which is preferably programmed with the typical dynamics of the axes of the redundant movable element, or rather axes u, v of the movable element 12. A separation system of the trajectories selects, offline or during the process, in a manner known per se, for example those described in European patent EP 1 758 003 by the same Applicant, a trajectory with low dynamics (low accelerations and velocity) with which to control the transport structure 11, which corresponds in this case to the large or slower machine. The component of difference with respect to the trajectory initially programmed, in particular of emission or sintering, is determined offline or during the process for controlling the redundant axes of the movable element 12 that move the crown 30 so as to obtain the convergence of powder and gas flows in the required point. Therefore, given the point on which to perform the sintering and the point in which the transport structure 11 is located to which the optical laser 20 is integral, it is envisaged, for example, with inverse kinematic calculation, offline or during the process, to determine the orienting and focussing command of the laser beam L and the spot S, through which to perform the sintering method.

Therefore, in various embodiments, the distribution of trajectory components comprises subtracting the component distributed on the transport structure 11 from said emission or sintering trajectory and assigning a trajectory component, resulting from the subtraction, to the movable element 12 or, respectively, to the actuators of the optical scanning means 20. As said, also with reference to FIG. 6a, the sintering trajectory essentially follows the emission trajectory, in particular with a time delay.

As already mentioned with reference to FIG. 6b, a different embodiment envisages the use of the operating machine 10 for a sintering with a typology more similar to the powder bed technology. Through an increase in the flow rate of the powder jets U and the protection gas, a reduced version of the powder bed with a diameter and a planar shape dependent on the flow rate used can be locally implemented, the diameter being in any case greater than that employed in the deposition points PD of the metal deposition technique. With the same path of the point on which to direct the laser spot S, the mode for distributing the trajectories is varied. In particular, as in the previous case, a version with low dynamics with which to control the transport structure 11 is selected offline or during the process by the high dynamic work path of the movable element or crown 30. However, in this case, the command of the redundant movable element 12 is not determined by difference, but in order to have a sequence of local powder beds that are followed with very high dynamic movements of the axes of the redundant movable element. By performing the inverse kinematic calculation offline or during the process, it is possible to determine a configuration of the optical scanner 20, which directs the focused laser spot S towards the programmed point that is contained within the local powder bed PB. Therefore this embodiment envisages the setting, together with said powder emission path LP, commands for adjusting the flow rate for depositing powder areas on the work plane 110, by means of increasing the emission flow rate, in defined points of said path LP, and for controlling a sintering path that moves the laser spot S according to shapes within said powder beds PB.

The different embodiments can be used alternatively in the manufacturing program of an object, also in relation to geometrical aspects and/or linked to the manufacturing process.

Therefore, from what is described, the solution described and the relative benefits are clear.

The laser operating machine according to the invention is able to operate in a flexible way thanks to the fact that the nozzles for powder emissions are movable with respect to the optical laser.

The laser operating machine according to the invention is able to operate with extreme precision and rapidity within useful volumes that can also be large, thanks to the coordination, on one hand, between the displacements of the entire movable element in a relatively wide space, with relatively low movements and accelerations, and on the other, the displacements of the movable element, and consequently the jet composite of the plurality of nozzles, and of the laser scanner that, with redundant movements at high velocities and accelerations, conveniently allows direction of a focused laser beam towards the point on which to sinter the additive powder. In this way, it is possible to locally replicate the advantages of the powder bed technology, operating with continuity on large volumes only manageable with metal deposition technology.

The possible presence of balancing masses, operatively associated with the movement axes of the movable element, enables, despite the high dynamic performances, drastic reduction of the transmission of unwanted vibrations of the movable element to the transport structure of the machine, ensuring processing and productivity accuracy on the extended work volume, typical of the transport structure.

Advantageously, eliminating the alignment between the laser beam and the jet of powders, typical of the metal deposition technology, makes the use of a protection gas in the process possible, which is also not aligned to the laser beam, locally influencing the work atmosphere, with a gas such as nitrogen or argon, thus replicating on a small scale and on the entire work volume, the advantages of the manufacturing chamber of the powder bed machines.

The different arrangement of the powder jets, in particular on a frame through which the laser beam passes, and the laser with respect to a classical machine for depositing powders also allows separating and optimizing technological aspects which were previously scarcely controllable.

Of course, without prejudice to the principle of the invention, the details and the embodiments may vary, even significantly, with respect to what is described purely by way of example, without departing from the scope of protection. This scope of protection is defined by the attached claims.

In various embodiments, within the nozzles, the powder can be preheated so as to better control the process, preventing surface tensions during the metal deposition due to thermal shock in the various work steps.

In various embodiments, the flow rate of the nozzles can be varied so as to adjust the shape of the local powder bed, also in relation to the shape to be produced, to the type of powder used and consequently to the diameter of the focused laser beam.

In various embodiments, the use of the optical fibre for conducting the laser radiation towards the optical unit and the scanner head allows, associating a second laser source suitable for ablation, for example of the ultrafast-type, or rather with impulse emission lasting in the order of picoseconds, the alternating of the sintering process with a laser ablation process for finishing any processing defects associated with the additive manufacturing.

In various embodiments, it is envisaged to exploit the modular structure of the movable element for possibly associating a vision system that, monitoring the area on which the sintering is performed, parallelly to the laser, detects the presence of any defects in the manufacturing process.

The laser operating machine in the preferred embodiments described comprises a plurality of nozzles associated with the tool-carrier frame, in particular defining a perimeter, in particular a circular perimeter, this plurality of nozzles and their arrangement presenting specific advantages in terms of flexibility and simplicity, even with respect to the position of the laser beam, and in terms of alignment of the flows (in particular by adding a nozzle for the protection gas). However, the main concepts described above also extend to a machine where a frame or support bears a single nozzle for emitting the powders, which is associated with the second system of movement axes of the movable element and movable with respect to the optical unit.

In various embodiments, the movable element comprises, in its system of movement axes, rotational axes suitable for making the tool-carrier frame tiltable according to one or more axes, for example, if the frame defines a plane according to an axis contained in this plane, or if, as in the case of a single nozzle, it defines just one support axis, according to each axis not coinciding with said support axis. In this way, these rotation axes define, together with the frame means, the orientation of the powder jet, which therefore allow a movement of the jet of powder on a circumference arc or on a spherical surface. The movable element may therefore comprise rotational and/or translational axes, and in particular, may comprise rotational axes in addition to the embodiment described above with Cartesian redundancy (X, Y, u, v), taking care to insert the circular or spherical rotation axes downstream of the sliding system, or rather of the translational axes u, v. One of the advantages of introducing orientating means of the powder jet is that they allow passing from a planar management of the working points to a three-dimensional management, which may be convenient in the case of complexly-shaped objects. The combination of these rotational redundancy components can possibly allow preparation of the powder beds PB orienting the powder jet of the nozzles according to a different angle from that of the laser beam.

In various embodiments, the plurality of axes of the movable element is obtained by means of a parallel kinematic machine arrangement, configured for positioning the tool-carrier frame in a three-dimensional space, with its defined orientation, or tilt, in order to achieve the various advantages of the different embodiments described above. In particular, this parallel kinematic arrangement can be obtained through combinations of translational and rotational axes, redundant to each other and possibly connected, to each other and/or to the tool-carrier frame, through passive prismatic robotic joints and/or revolute (in the usual shapes of the Cartesian joints, cylindrical, rotational and spherical), for example, in the form of a parallel manipulator or a Stewart platform. As mentioned, in general, introducing redundant structures within the movable element involves performing an inverse kinematic calculation, for control, in a manner known per se to those skilled in the art, either offline, or during the process, in order to determine the commands to all the axes of said movable element.

The invention claimed is:

1. Laser operating machine for additive manufacturing of objects by laser sintering, comprising a transport structure, which is movable in a work space, operating according to a first system of movement axes comprising a first plurality of axes and configured to support one or more nozzles for emitting sintering powder jets to be sintered on a work substrate and an optical laser assembly for conveying a laser beam into a laser spot focused on said work substrate to sinter said powders, characterized in that said optical laser assembly is integrally associated with said transport structure, and a movable element is also integrally associated with said transport structure, said optical laser assembly and said movable element not being fixed to each other, said movable element operating according to a second system of movement axes comprising a second plurality of axes, said movable element comprising a tool-carrier frame, on which one or more nozzles for emitting sintering powder jets are arranged, associated with said second system of movement axes comprising the second plurality of axes and movable with respect to said optical laser assembly according to said second system of movement axes comprising the second plurality of axes.

2. Machine according to claim 1, wherein said optical laser assembly comprises optical scanning means for positioning said laser spot in the work space operating according to a third system of movement axes.

3. Machine according to claim 1, wherein a plurality of nozzles is arranged on said tool-carrier frame for emitting sintering powder jets and in that said optical scanning means are arranged to send the laser beam onto the work plane within a perimeter defined by said plurality of nozzles for emitting sintering powder jets.

4. Machine according to claim 1, wherein one or more nozzles for the emission of protection gas are also arranged on said frame.

5. Machine according to claim 3, wherein emission axes of said nozzles are inclined so that that they intersect in a powder deposition point (PD).

6. Machine according to claim 3, wherein said frame and said arrangement of a plurality of nozzles define a circular perimeter.

7. Machine according to claim 1, wherein said first system of movement axes comprises a Cartesian triad.

8. Machine according to claim 1, wherein said second system of movement axes comprises one or more rotation axes to make the tool-carrier frame tiltable, in particular said axes being place downstream of translation axes comprised in said second system of movement axes.

9. Machine according to claim 1, wherein said second system of movement axes is implemented by means of a parallel kinematic machine, configured to position the tool-carrier frame in a three-dimensional space and with its own orientation.

10. Machine according to claim 2, wherein said third system of movement axes comprises two rotation axes of an axis of the laser beam inciding on the work plane, perpendicular to each other, and a translation axis along said axis of the laser beam.

11. Machine according to claim 10, wherein said optical scanning means comprise a focussing element receiving the laser beam along an optical axis and comprising a lens movable along said optical axis to perform said translation of the laser spot, a stationary mirror receiving the laser beam at the output of said focussing element and deflecting it towards an orientable mirror, arranged to deflect the laser beam along said axis of the laser beam inciding on the work plane, said axis being in particular, in rest conditions, normal to the work plane, said orientable mirror being moved to orientate said axis along said two rotation axes.

12. Machine according to claim 1, wherein said optical assembly is associated with a second laser source, operable alternatively with respect to a first laser source performing the sintering, to perform a laser ablation process, in particular to refine possible work defects associated with the additive manufacturing.

13. Machine according to claim 1, wherein it comprises, a vision system associated with said movable element, to monitor an area of the work plane on which the sintering is performed, in particular to detect the presence of possible defects of the manufacturing process.

14. Method for the additive manufacturing of objects by laser sintering by a laser operating machine according to claim 1, comprising setting a powder emission path to emit powders of a material to be sintered on a work plane through said one or more nozzles in said frame according to said powder emission path, setting a laser sintering path to convey a focused spot of a laser beam through said optical assembly according to said laser sintering path on said powders emitted according to said powder emission path to perform their sintering, commanding actuators of the laser operating machine associated with axes of the machine by means of a numeric control unit and a servo-control module to perform trajectories through respective axes to implement said sintering path and emission path wherein, said operation of commanding actuators includes an operation mode wherein the actuators of said movable element are commanded to move said tool-carrier frame in a movable fashion with respect to said optical assembly.

15. Method according to claim 14, wherein supplying a powder emission trajectory generated from said emission path or a component of said trajectory to the actuators of the movable element to move said frame and supplying a sintering trajectory generated from said sintering path or a component of said trajectory to the actuators of the optical scanning means of said optical assembly.

16. Method according to claim 15, wherein performing a distribution of the components of the emission trajectory and/or of the sintering trajectory on said transport structure, in particular distributing low dynamic range components on said transport structure.

17. Method according to claim 16, wherein said distribution comprises subtracting the component distributed on the transport structure from said emission or sintering trajectory and assigning a trajectory component resulting from the subtraction to the movable element or, respectively, to the optical scanning means.

18. Method according to claim 14, wherein said sintering trajectory essentially follows said emission trajectory, in particular with a time delay.

19. Method according to claim 14, wherein sending flow rate adjustment commands, together with said powder emission path, for depositing on the work plane by increasing the emission flow rate in defined points of said path, powder areas and commanding a sintering path that moves the laser spot according to shapes within said powder areas.

20. Method according to claim 14, including pre-heating the powder within the nozzles.

\* \* \* \* \*